April 1, 1969 C. S. WHITFIELD 3,435,533

UNIVERSAL LEVEL

Filed Oct. 2, 1967 Sheet 1 of 2

INVENTOR
CALVIN S. WHITFIELD

BY Fisher, Christen, Sabol & Caldwell
ATTORNEYS

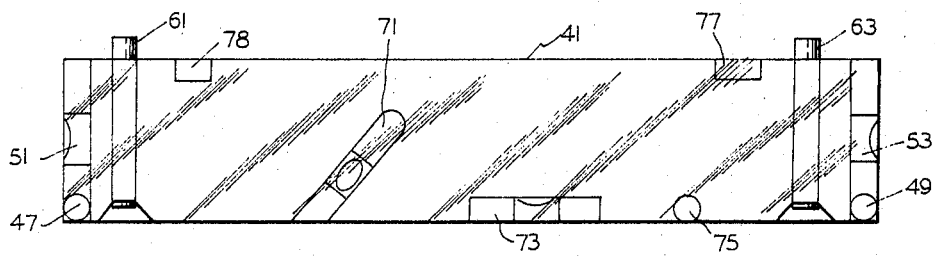
FIG. 6
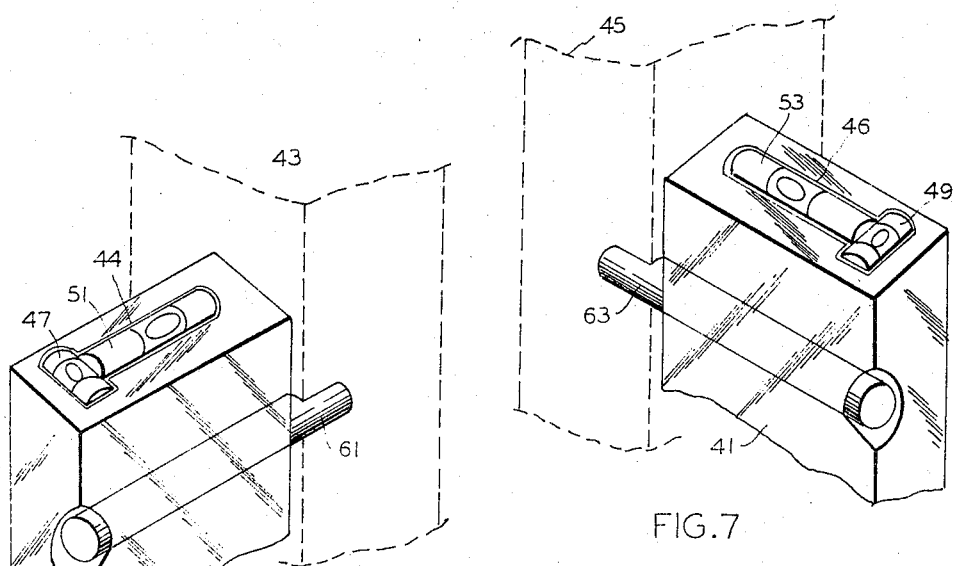
FIG. 7
FIG. 8
INVENTOR
CALVIN S. WHITFIELD

3,435,533
UNIVERSAL LEVEL
Calvin S. Whitfield, 2417 Glenwood Drive NE.,
Atlanta, Ga. 30305
Continuation-in-part of application Ser. No. 457,612,
May 21, 1965. This application Oct. 2, 1967, Ser.
No. 675,747
U.S. Cl. 33—211            2 Claims

ABSTRACT OF THE DISCLOSURE

A universal level comprising a transparent body or a light-weight skeletal body for holding a plurality of leveling tubes in a predetermined orientation. At least three of the tubes have their axes in a geometrical X–Y–Z relation with a fourth tube having its axis at an angle to said other axes. Preferably the fourth tube is a 30° or 45° angle tube. The arrangement also includes indexing pins for aligning the level with an edge of the building support member and preferably magnets for holding the level thereto. A further X-axis tube and a further Z-axis tube may be included with the X and Z pairs of tubes being disposed adjacent opposite ends of the body such that the level may be applied to either the right-hand edge or the left-hand edge of a member (whichever edge is accessible) by orienting it oppositely or in end-to-end fashion.

---

This application is a continuation-in-part of Ser. No. 457,612 by the same applicant for Universal Level filed May 21, 1967 and abandoned upon the filing hereof.

The present invention relates to an improved level capable of universal application to resolve a great many problems which heretofore confronted carpenters, steel workers and construction personnel in general.

The level of this invention is equipped with leveling tubes, at least four (4) in number, of which three have their axes mutually in right angle relation, similar to the well-known geometrical X, Y, and Z axes. The axis of the fourth leveling tube is disposed at an angle, usually a 45° angle, relative to the level, for use in constructing A-frames and the like.

The disposition of the leveling tubes may best be appreciated if it is assumed that the level is being used to align studs or 2 x 4's vertically, for example, in constructing a wall or house. The level itself may comprise a generally rectangular configuration, and when used to set the 2 x 4's, the long dimension of the rectangular level would also be vertical. With the level in the recited position the first three leveling tubes will be further described.

A pair of leveling tubes is arranged in orthogonal relation to define the vertical. The respective axes of this pair of tubes are in the horizontal plane with the to-and-fro axis, corresponding to the Z geometrical axis and the side-to-side axis corresponding to the X axis. Preferably, these two leveling tubes are spaced apart, but in proximity, in order that both may be read at a glance.

In aligning the stud to the vertical for permanent positioning, the workman simply reads the Z and X leveling tubes to position the stud vertically with respect to misalignment in the to-and-fro direction and misalignment in the side-to-side directions.

The third leveling tube has its axis disposed according to the Y axis, and it serves to level in the to-and-fro horizontal direction when the level is oriented with its major dimension in the horizontal. By also observing the X leveling tube, side-to-side horizontal leveling may be effected.

The fourth leveling tube is preferably set at a 45° angle with respect to the major axis of the level. Thus, this tube will display its bubble in the center position when the level is 45° from the horizontal. It may be appreciated that the X tube may also be used with the 45° tube for correction in the side-to-side directions at the 45° angle. The angle tube obviously may be set at a 30° or 60° angle to the horizontal (or any other angle) or alternatively several single tubes may be employed.

In addition the level is equipped with a pair of spaced apart pins which are biased outwardly to define a straight line therebetween. The pins engage the edge of the 2 x 4 in order that the level may be aligned parallel to the stud.

Also, the level is equipped with a pair of magnets which are preferably set flush in the contact surface and which are strong enough to support the weight of the level when set against a steel beam.

With these many features of the invention in mind, it should be appreciated that a steel worker, for example, who is welding an A-frame at a 45° angle can align the level with the pins and fix it to the steel frame with the magnets and then use his two hands to correctly orient the beam while observing the leveling tubes and also weld. Heretofore at least two levels and four hands were required to perform the same task that is now possible by virtue of this invention.

The preferred embodiment of this invention employs the same tubes aforedescribed, and in addition, a further pair of X and Z tubes (with the level standing on end) such that two pairs of X and Z orthogonally oriented tubes are disposed in spaced apart horizontal planes. Preferably, one pair of the X and Z tubes is visible or readable through one end of the level whereas the other pair of X and Z tubes is visible or readable through the other end of the level.

These pairs of tubes need not necessarily be at the end of the level, but each pair of tubes must be in a horizontal plane when the level is vertical and each must be readable relative to a different end of the level.

This arrangement enables vertical alignment of studs or steel beams or the like wherein access is only available from one edge. For example, the pins are depressed, to their projected position, and the level is positioned adjacent the available edge of the structural member. If the right-hand edge is available, reading is accomplished through or at one end of the level, but if the left-hand edge is available, reading is accomplished through or at the other end of the level. Thus, with the X and Y tubes readable at a glance, it is unnecessary to move the level from one side of a structural member to the adjacent side of the structural member in order to align the vertical, i.e., both in north and south and east and west directions, which affords the improvement over conventional levels having single tubes in that no movement and consequent correction of the member is required after it has been aligned north and south and then subsequently east and west.

It is accordingly among the objects of the invention to provide a multi-purpose level.

It is a further object to provide a common side-to-side direction correcting leveling tube for use with anyone of several other associated tubes to permit three-dimensional alignment.

A still further object of the invention is the provision of alignment pins on such a level, as well as magnetic holding means for facilitating heretofore difficult tasks.

Another object is the provision of a level for use with vertical structural members having access to only one edge thereof.

A further object is the provision of a level, which will permit vertical alignment by locating only once against one edge of the structural member thereby aligning east-west and north-south directions without movement of the level.

The invention will now be described in connection with the drawings wherein:

FIG. 6 is a view in side elevation of the preferred embodiment of the invention;

FIG. 7 is a view in perspective of one end of the structure of FIG. 6; and

FIG. 8 is a view in perspective of the other end of the structure of FIG. 6.

The level 11 is herein shown having its body member constructed of clear plastic. While this is a suitable material, nevertheless the body 13 may be comprised of wood or aluminum or other usual materials. It may also simply constitute a skeleton-like frame capable of mounting the leveling tubes and other structures herein described, in the orientations set forth.

Conventional leveling tubes are employed as the X, Y, Z and 45° or other angle tubes. The X tube is shown at 15 with the leveling bubble 17 in the visual center of the tube 15. The Z tube is shown at 19, in proximity with the X tube 15, but oriented at 90° thereto.

Figure 2:
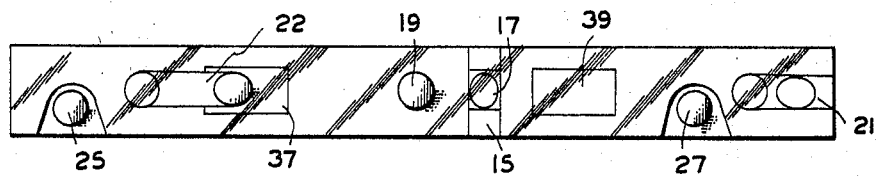
FIG. 2 is a top plan view of the level of FIG. 1.
Figure 1:
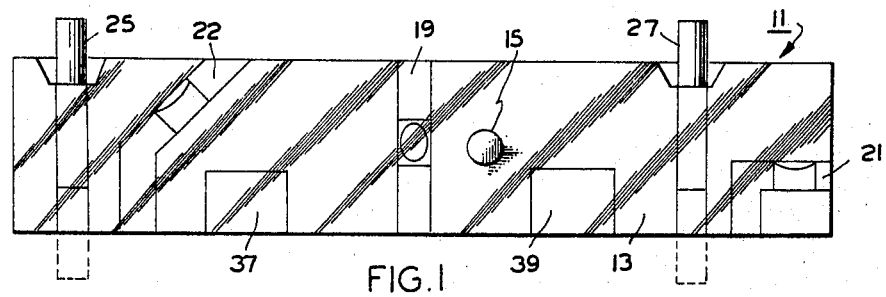
FIG. 1 is a view of the level in side elevation.
Figure 4:
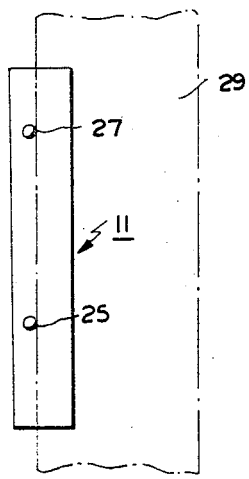
FIG. 4 is a schematic to show the use of the alignment pins.

The horizontal or Y tube is shown at 21 and the angle tube at 22. The alignment pins 25 and 27 are shown in extended position in FIG. 1. In FIG. 4 the pins 25 and 27 are in contact with the edge of a 2 x 4 or stud 29 to align the level 11 with the stud 29.

Figure 5:
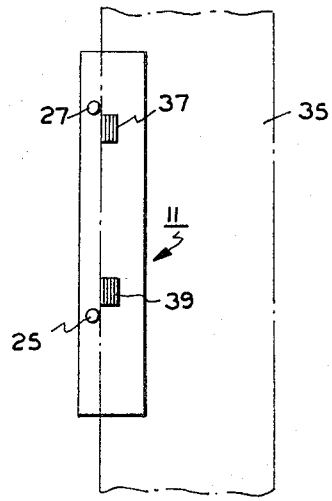
FIG. 5 shows the use of the pins and magnetics.

In FIG. 5 the pins 27 and 25 are in contact with the edge of a steel girder 35 and the magnets 37 and 39 are maintaining the aligned position by magnetically gripping the girder 35. The magnets could be substituted for by equivalent magnetic strip materials.

The pins or indexing means 25 and 27 may be fixed in the extended position relative to one surface of the level. Alternatively, the pins may be resiliently biased outwardly to the positions of FIG. 1 by internal springs (not shown) in any known manner.

Figure 3:
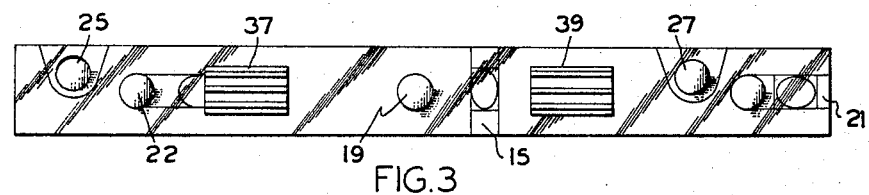
FIG. 3 is a bottom view of the level.

The magnets 37 and 39 are simply recessed into the body 13 (or frame) in flush positions relative to the operative or bottom surface of the level 11, as seen in FIG. 3.

In FIG. 6 the transparent body 41 (or its equivalent skeletal body, not shown) is provided with two pairs of X and Y tubes, respectively associated and respectively disposed at opposite ends of the body.

In FIGS. 7 and 8 the device is shown as applied to steel beams, or the like depicted in dotted outline at 43 and 45. In these figures, and with the device in the vertical orientation, it will be clear that tubes 47 and 49 are the X tubes, while tubes 51 and 53 are the Z tubes. The tubes 47 and 51 are preferably located in recess 44, while tubes 49 and 53 are disposed in recess 46.

It will also be noted that in line pins 61 and 63 are used to align the body 41 with the right and left hand edges of the angle irons or beams 43 and 45. Thus, in FIG. 7 it is assumed that the left-hand edge of beam 45 was inaccessible; and, therefore the device 41 was oriented with its right-hand end upwardly and tubes 53 and 49 on the right end of the body 41 used.

In FIG. 8 it is assumed that the left hand edge of beam 43 was inaccessible, so the device was oriented with its left hand end upwardly and tubes 51 and 47 employed.

The body 41 also includes the other elements already explained, such as the 45° tube 71, Y tube 73, as well as an additional X tube 75. Also magnets 77 and 78 are retained for steel work.

While the subject invention has been described in its preferred form, it should be understood that modifications can be made thereto, within the scope of the principles taught.

What is claimed is:

1. A universal level comprising in combination
   a transparent body having a planar bottom surface, a top surface parallel to said planar bottom surface, a side surface perpendicular to said planar bottom surface, and first and second end surfaces;
   a first leveling tube disposed in said body to be viewable at said top surface and having an axis disposed parallel to said planar bottom surface of said body;
   a second leveling tube disposed in said body to be viewable at said first end surface and said top surface, said second leveling tube having an axis disposed perpendicular to the axis of said first leveling tube so that said first and second leveling tubes are viewable at said top surface to permit level indications in two directions with respect to a substantially horizontal surface of an object;
   a third leveling tube disposed in said body to be viewable at said first end surface, said third leveling tube having an axis disposed perpendicular to the axes of said first and second leveling tubes so that said second and third leveling tubes are viewable at said first end surface to permit level indications in two directions with respect to a substantially vertical surface of an object;
   a fourth leveling tube disposed in said body to be viewable at said second end surface and said top surface, said fourth leveling tube having an axis disposed perpendicular to the axis of said first leveling tube so that said first and fourth leveling tubes are viewable at said top surface to permit level indications in two directions with respect to a substantially horizontal surface of an object;
   a fifth leveling tube disposed in said body to be viewable at said second end surface, said fifth leveling tube having an axis disposed perpendicular to the axes of said first and fourth leveling tubes so that said fourth and fifth leveling tubes are viewable at said second end surface to permit level indications in two directions with respect to a substantially vertical surface of an object;
   a sixth leveling tube disposed in said body to be viewable at said top surface, said sixth leveling tube having an axis disposed perpendicular to the axis of said first leveling tube so that said first and sixth leveling tubes are viewable at said top surface to permit level indications in two directions with respect to a substantially horizontal surface of an object;
   a seventh leveling tube disposed in said body to be viewable at said side surface and said top surface, said seventh leveling tube having an axis disposed at an acute angle to the axis of said first leveling tube perpendicular to the axes of said second and fourth leveling tubes, and in a plan common to the axes of said third and fifth leveling tubes so that said second, fourth, sixth and seventh leveling tubes are viewable at said top surface to permit level indications in two directions with respect to an angular surface of an object; and
   indexing means including a plurality of rods extending from said planar bottom surface of said body for aligning said universal level with the edge of an object and means for retracting said rods into said body;
   whereby said universal level may be used to bidirectionally position a surface of an object vertically, horizontally or angularly.

2. The invention as recited in claim 1 wherein a plurality of permanent magnets are embedded in said planar bottom surface of said body whereby said universal level may be secured to objects of magnetizable material.

References Cited

UNITED STATES PATENTS

| 232,982 | 10/1880 | Langdon | 33—211 |
| 556,703 | 3/1896 | Starrett et al. | |
| 1,855,394 | 4/1932 | Hill | 33—207 |
| 2,790,069 | 4/1957 | Alexander | 33—212 XR |
| 2,791,036 | 5/1957 | Gericke | 33—212 |
| 2,813,349 | 11/1957 | Harris | 33—211 |
| 2,833,054 | 5/1958 | Wheeler | 33—207 |
| 3,088,216 | 5/1963 | Jesonis | 33—211 |

ROBERT B. HULL, *Primary Examiner.*

DENNIS A. DEARING, *Assistant Examiner.*

U.S. Cl. X.R.

33—207